(12) United States Patent
Lee et al.

(10) Patent No.: US 8,790,107 B2
(45) Date of Patent: Jul. 29, 2014

(54) ICE CREAM SCOOP

(75) Inventors: Tung-Hsien Lee, Yongkang (TW); Sheng-Chi Lin, Tainan (TW)

(73) Assignee: Intercontinental Marketing Services Far East Co., Ltd., New Taipei (TW)

( * ) Notice: Subject to any disclaimer, the term of this patent is extended or adjusted under 35 U.S.C. 154(b) by 428 days.

(21) Appl. No.: 13/312,466

(22) Filed: Dec. 6, 2011

(65) Prior Publication Data

US 2012/0093958 A1 Apr. 19, 2012

Related U.S. Application Data

(63) Continuation-in-part of application No. 12/772,593, filed on May 3, 2010, now abandoned.

(51) Int. Cl.
*A47J 43/28* (2006.01)

(52) U.S. Cl.
USPC ............ 425/282; 425/187; 425/221; 425/276; 425/277; 425/278; 425/280; 425/281; 425/283; 425/284; 425/285; 425/286

(58) Field of Classification Search
CPC .......... A47J 43/28; A47J 43/282; A23G 9/28; A23G 9/283; A23G 9/287; A23G 9/288
USPC ......... 425/187, 221, 276, 277, 278, 279, 280, 425/281, 282, 283, 284, 285, 286
See application file for complete search history.

(56) References Cited

U.S. PATENT DOCUMENTS

| | | | | |
|---|---|---|---|---|
| 741,015 A | * | 10/1903 | Craven | 425/285 |
| 781,899 A | * | 2/1905 | Nielsen | 425/187 |
| 820,473 A | * | 5/1906 | Buchanan | 425/282 |
| 825,147 A | * | 7/1906 | Mosteller | 425/283 |
| 900,573 A | * | 10/1908 | McCarren | 425/187 |
| 1,016,711 A | * | 2/1912 | Roller | 425/221 |
| 1,132,870 A | * | 3/1915 | Nielsen | 425/187 |
| 1,200,225 A | * | 10/1916 | Nielsen | 425/285 |
| 1,246,032 A | * | 11/1917 | Bluhm | 425/285 |
| 1,699,914 A | * | 1/1929 | Persson | 425/278 |
| 1,728,505 A | * | 9/1929 | Palmer | 425/285 |
| 1,774,154 A | * | 8/1930 | Phillips | 425/285 |
| 1,829,442 A | * | 10/1931 | Flegel | 425/285 |
| 1,847,328 A | * | 3/1932 | Berzon | 425/285 |
| 1,903,791 A | * | 4/1933 | Myers | 425/187 |

(Continued)

FOREIGN PATENT DOCUMENTS

GB 185933 A * 9/1922 ............. A47J 43/28

*Primary Examiner* — Timothy Kennedy
(74) *Attorney, Agent, or Firm* — Wang Law Firm, Inc.; Li K. Wang; Stephen Hsu (57) ABSTRACT

An ice cream scoop includes a handle, a scooper coupled to an end of the handle, a scraper installed in the scooper, a link rod extended from an end of the scraper into the end of the handle, and a transmission device installed on the link rod. The ice cream scoop further includes an operating device with an end pivotally coupled to the handle, such that the operating device can be swayed between a first position and a second position with respect to the handle. The operating device further includes a driving portion coupled to the transmission device. If the operating device is swayed between the first and second positions, the link rod will be rotated, and the scraper will be moved along an internal wall of the scooper.

7 Claims, 7 Drawing Sheets

(56) References Cited

U.S. PATENT DOCUMENTS

| | | | |
|---|---|---|---|
| 2,041,200 A * | 5/1936 | Myers | 425/187 |
| 2,085,381 A * | 6/1937 | Myers | 425/187 |
| 2,155,700 A * | 4/1939 | Donahue | 425/187 |
| 2,439,125 A * | 4/1948 | Bolinger | 425/280 |
| 2,498,331 A * | 2/1950 | Bloomfield | 425/187 |
| 2,756,698 A * | 7/1956 | Eichin et al. | 425/286 |
| 2,780,183 A * | 2/1957 | Myers | 425/187 |
| 2,815,724 A * | 12/1957 | Baer | 425/285 |
| 4,150,459 A * | 4/1979 | Siclari | 425/279 |
| 4,161,381 A * | 7/1979 | Sciortino | 425/286 |
| 4,699,582 A * | 10/1987 | Chen | 425/187 |
| 2005/0025851 A1* | 2/2005 | Horng | 425/283 |

* cited by examiner

ICE CREAM SCOOP

CROSS-REFERENCE TO RELATED APPLICATION

This application is a Continuation-In-Part Application of Ser. No. 12/772,593, filed on May 3, 2010, and entitled "ICE SCREAM SCOOP", now pending.

BACKGROUND OF THE INVENTION

1. Field of the Invention

The present invention relates to an ice cream scoop, and more particularly to an improved manually operating ice cream scoop.

2. Description of the Related Art

Ice cream scoop is used extensively for serving ice cream by making and depositing ice cream balls. A conventional ice cream scoop generally includes a hemispherical scooper, a handle coupled to the scooper, a semi-circular scraper installed in the scooper, a link rod coupled to an end of the scraper, and a gear combined with the link rod. The handle includes two separated handle portions, and a spring installed between the two handle portions. The two handle portions can be operated to move towards each other or apart from each other by an elastic force. If a user holds the handle and applies a force to move the two handle portions towards each other, the gear of the link rod will be driven to move the scraper along an internal wall of the scooper, so as to scrap an ice cream ball from the scooper. However, the conventional ice cream scoop usually comes with a relatively large size which is inconvenient for users to hold. Furthermore, the link rod and the gear of the conventional ice cream scoop are exposed to the outside, not just causing a poor appearance look only, but also becoming dirty or damaged easily. In addition, the link rod of the conventional ice cream scoop is relatively long and thus incurs higher material and manufacturing costs.

SUMMARY OF THE INVENTION

Therefore, it is a primary objective of the present invention to overcome the shortcomings of the prior art by providing an ice cream scoop with a convenient operation, a small size, and a good appearance, and the advantages of saving costs and uneasy to get dirty or damaged.

It is another objective of the present invention to have the gear rapidly and accurately fixed on the link rod.

To achieve the foregoing objective, the present invention provides an ice cream scoop comprising a handle, a scooper, a scraper, an operating device, a gear and a spiral spring. The handle includes a first end and a second end separated from each other and disposed along a longitudinal axis of the handle, and a chamber formed in the first end of the handle. The scooper includes a hemispherical internal wall that defines an opening of the scooper, and the scooper is coupled to the first end of the handle. The scraper is swingingly installed in the scooper and includes a first end and a second end separated from each other and disposed on the longitudinal axis, and the first end of the scraper is pivotally coupled to the scooper, and a link rod is extended from the second end of the scraper, passed through the scooper, and extended into a chamber at the first end of the handle. The gear is installed onto the link rod and rotated synchronously with the link rod; the gear includes a plurality of transmission gear teeth arranged in radial shape. The operating device includes a first distal portion and a second distal portion separated from each other and disposed on the longitudinal axis, and an end of the operating device is pivotally coupled to the first end of the handle by a pin, such that the operating device can be swayed between a popup position and a press position of the handle. The operating device further includes a plurality of separated grooves formed on one side wall, and arranged in a radial shape by using the pin as an axis, and the plural grooves also are arranged in a curved shape with an equal distance from the pin, such that when the gear rotates, the plural transmission gear teeth are engaged with the corresponding plural grooves to push the operating device to the popup position. The spiral spring is accommodated inside the chamber of the first end and sheathed on the link rod, and one side of spiral spring abuts against the scooper at the first end of the handle, and the other side abuts against one side of the gear, and one end of the spiral spring abutting against the scooper has an end tip fixed onto the first end of the handle, and the other end of the spiral spring has another end pin fixed onto the gear. When the gear rotates, the gear also drives the spiral spring to rotate. The gear has a position restoring effect. With the engagement of the transmission gear teeth and the grooves, the operating device stays in the popup position normally, and when the operating device sways between the popup position and the press position the plural grooves are engaged with the transmission gear teeth in a bottom up direction in order to drive the gear to rotate, and the gear also drives the link rod to rotate and make the scraper to sway along the inner wall of the scooper.

In a preferred embodiment, the handle further includes an upper portion and a lower portion separated from each other and arranged in a heightwise direction perpendicular to the longitudinal axis, and an installing hole is formed at the upper portion of the first end of the handle and interconnected to the chamber of the handle. The operating device is installed through the installing hole into the chamber of the first end of the handle. The scooper includes an upper end and a lower end separated from each other and arranged in the heightwise direction, and an opening of the scooper is disposed at the upper end of the scooper.

The foregoing and other objectives, advantages and characteristics of the invention will become apparent with the detailed description of preferred embodiments and the illustration of related drawings as follow.

DETAILED DESCRIPTION OF THE PREFERRED EMBODIMENTS

With reference to FIGS. 1 to 7 for an ice cream scoop 10 in accordance with a preferred embodiment of the present invention, the ice cream scoop 10 comprises a handle 12, a scooper 14, a scraper 16 and an operating device 18.

Figure 1:
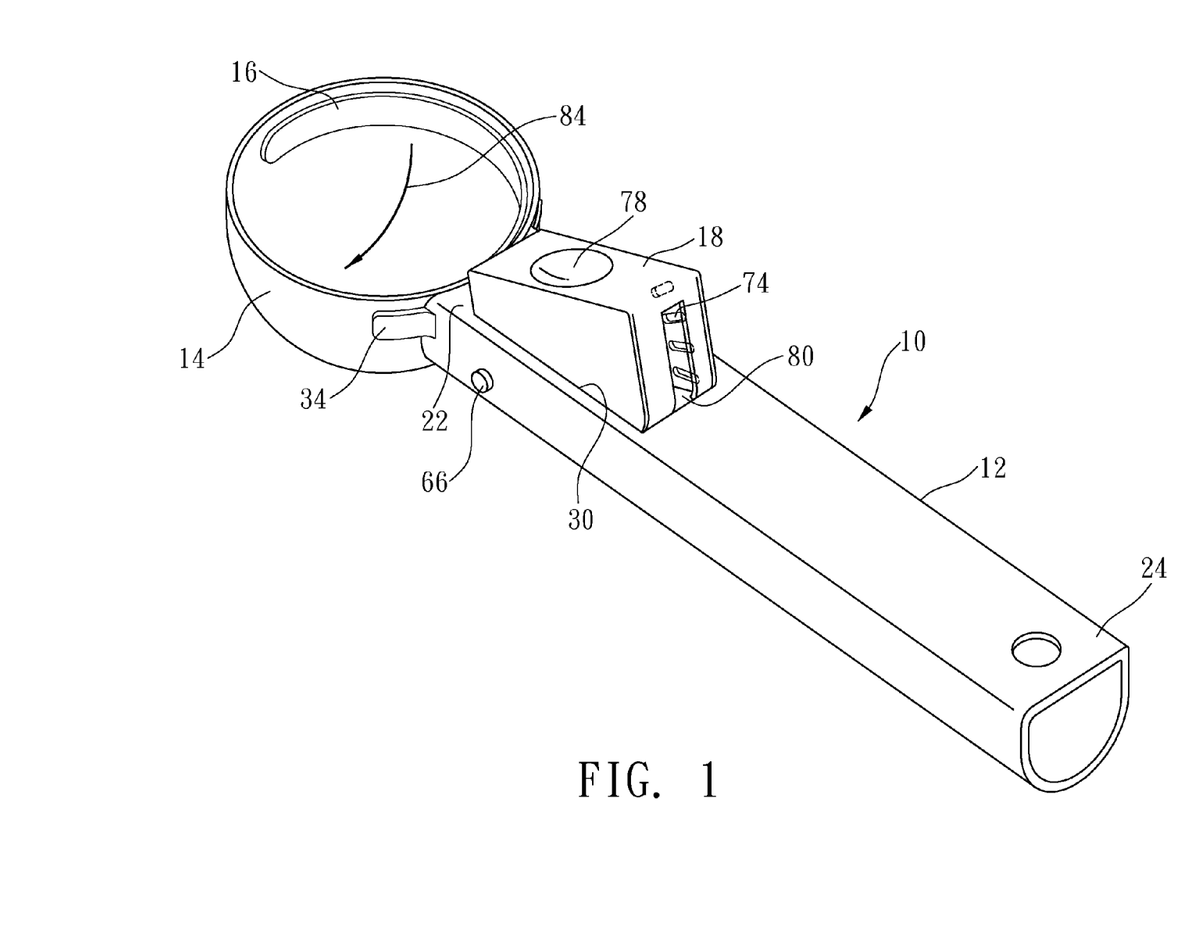
FIG. 1 is a perspective view of an ice cream scoop in accordance with a preferred embodiment of the present invention.
Figure 2:
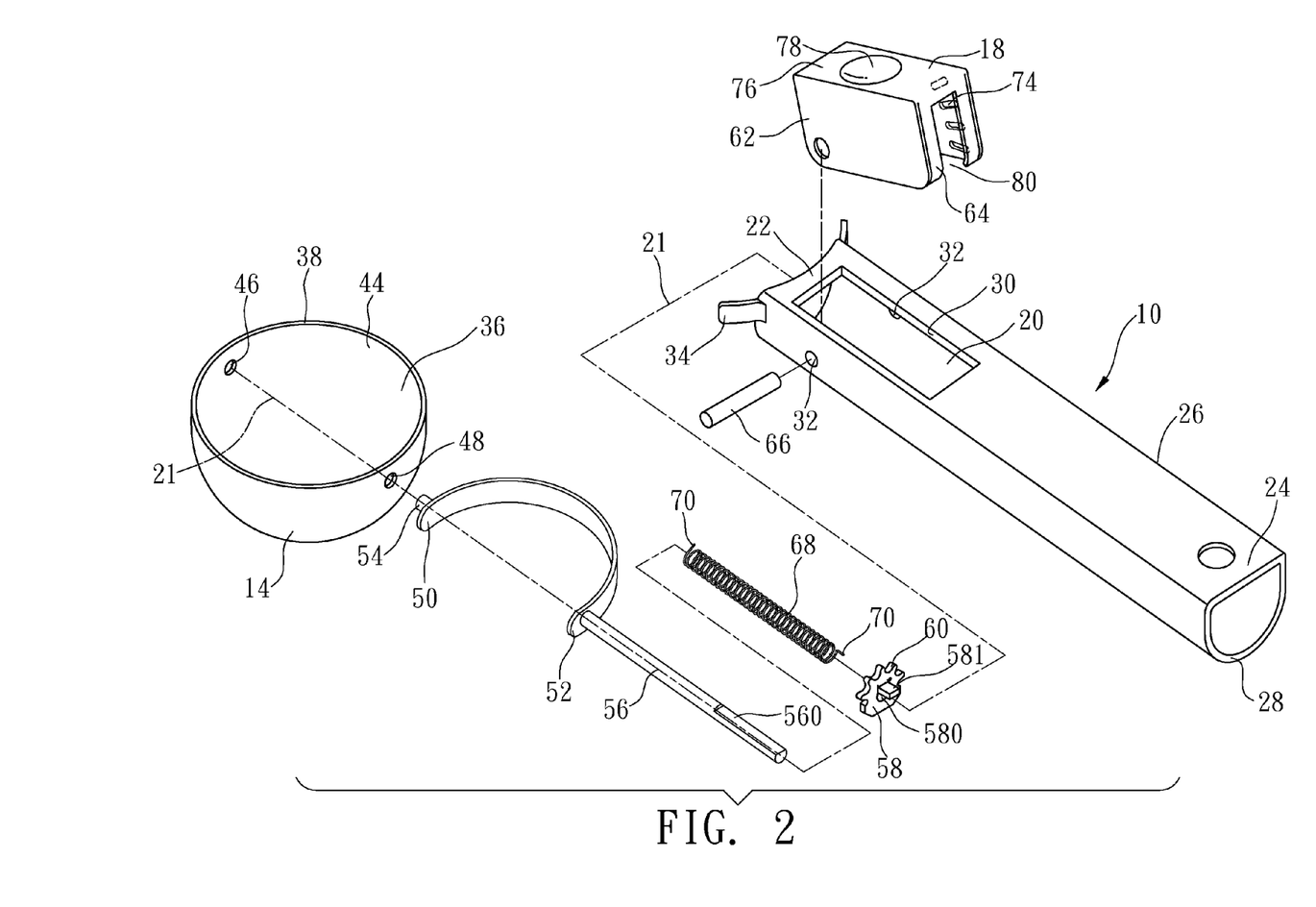
FIG. 2 is an exploded view of an ice cream scoop in accordance with a preferred embodiment of the present invention.

As shown in FIGS. 1 and 2, the handle 12 is a pipe containing a chamber 20 therein, and the handle 12 includes a first end 22 and a second end 24 separated from each other and disposed on a longitudinal axis 21, and the handle 12 further includes an upper portion 26 and a lower portion 28 separated from each other and arranged in a heightwise direction perpendicular to the longitudinal axis 21, and an installing hole 30 is formed at the upper portion 26 of the first end 22 of the handle 12 and interconnected to the chamber 20. Two through holes 32 are formed on both sides of the first end 22 of the handle 12 respectively, and each through hole 32 is interconnected to the chamber 20 of the handle 12. In addition, a connecting plate 34 is extended separately from both sides of the first end 22 of the handle 12.

As shown in FIGS. 1 and 2, the scooper 14 is a case having a hemispherical internal wall 36, and coupled to the connecting plate 34 of the first end 32 of the handle 12. The scooper 14 includes an upper end 38 and a lower end 40 separated from each other and disposed on the heightwise direction, and a circular edge having a circular opening defined therein is disposed at the upper end 38 of the scooper 14 and provided for scooping ice cream. A first hole 46 and a second hole 18 are formed at the upper end 38 of the scooper 14, separated from each other, and disposed on the longitudinal axis 21, and the second hole 48 is proximate to the first end 22 of the handle 12.

As shown in FIGS. 1 and 2, the scraper 16 is a semicircular plate swingingly installed in the scooper. The scraper 16 includes a first end 50 and a second end 52 separated from each other and disposed on the longitudinal axis 21, and a pillar 54 is extended from the first end 50 of the scraper 16 and inserted into and coupled to the first hole 46 of the scooper. A link rod 56 is extended from the second end 52 of the scraper 16, passed through the second hole 48 of the scooper 14, and extended along the longitudinal axis 21 into the chamber 20 at the first end 22 of the handle 12.

Figure 3:
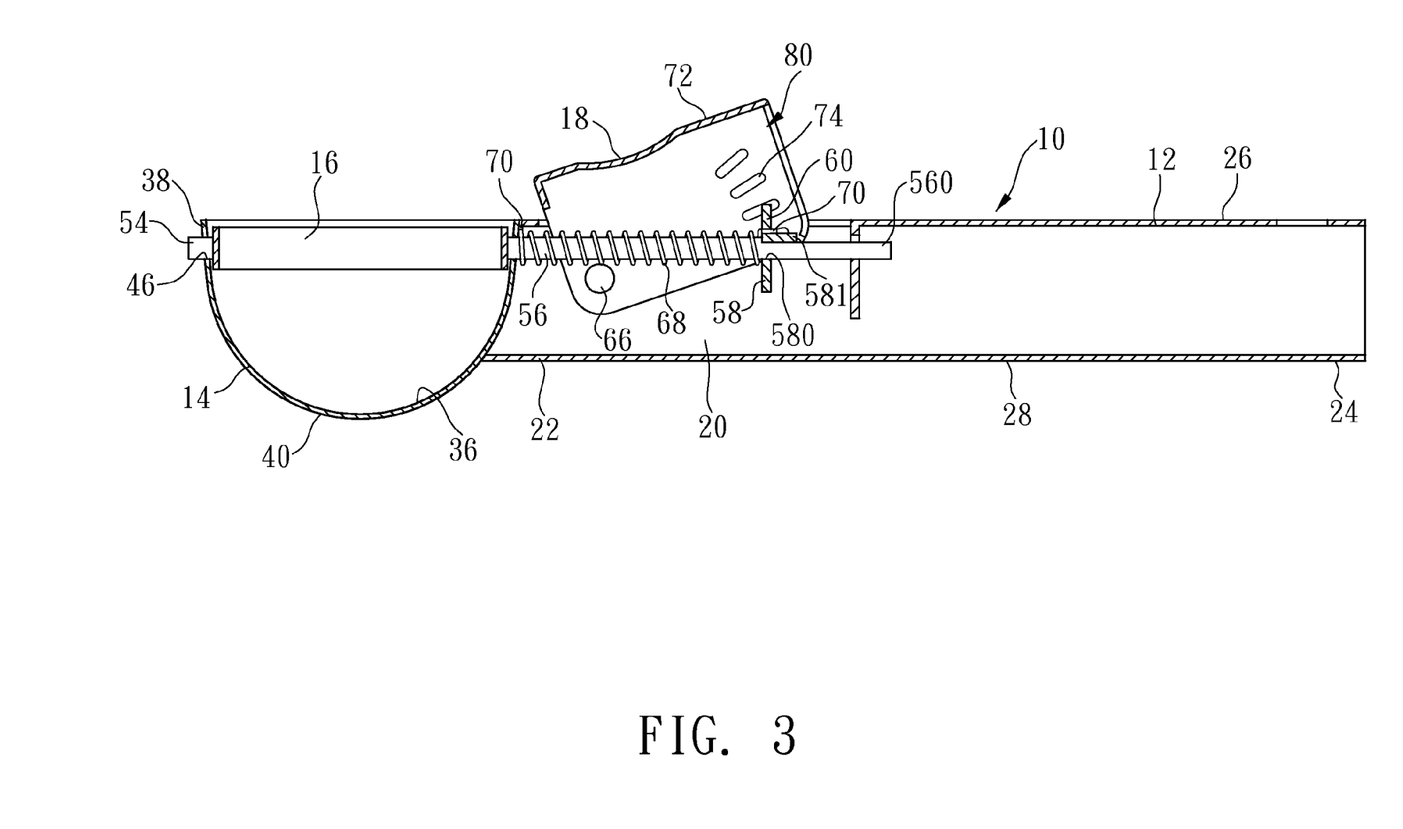
FIG. 3 is a cross-sectional view of an ice cream scoop in accordance with a preferred embodiment of the present invention.

A gear 58 is installed onto the link rod 56 and rotated synchronously with the link rod 56, the gear has the plural transmission gear teeth arranged in a radial shape. As shown in FIGS. 2 and 3, in this preferred embodiment, a through hole 580 for passing the link rod 56 is formed on the gear 58; a stopper 581 is installed adjacent to the through hole 580, the stopper 581 is bent outwardly when the through hole 580 is formed, the stopper 581 abuts against a tangent 560 formed by processing the link rod 56, and the stopper 581 is fixed on the link rod 56 by welding, such that the gear 58 can be fixed onto link rod 56 precisely and rapidly.

The operating device 18 is installed into a case in the installing hole 30 of the handle 12. The operating device 18 includes a first distal portion 62 and a second distal portion 64 separated from each other and disposed on the longitudinal axis 21. A pin 66 is passed through the first distal portion 62 of the operating device 18 and pivotally coupled to the first end 22 of the handle 12, such that the operating device 18 can be swayed between the popout position and the press position of the handle 12 by using the pin 66 as the pivotal axis. In this preferred embodiment, both ends of the pin 66 are inserted and fixed into the two through holes 32 of the first end 22 of the handle 12 respectively.

A spiral spring 68, as shown in FIGS. 2 and 3 is accommodated in the chamber 20 of the first end 22 of the handle 12 and sheathed on the link rod 56, and one side of spiral spring 68 abuts against the scooper 14 at the first end 22 of the handle 12, and the other side abuts against one side of the gear 58, and one end of the spiral spring 68 abutting against the scooper 14 has an end tip 70 fixed on the first end 22 of the handle 12, and another end tip 70 on the other end of the spiral spring 68 abutting against the gear 58 is fixed onto the gear 58, when the gear 58 rotates and drives the spiral spring 68 to rotate to provide a position restoring effect.

Figure 4:
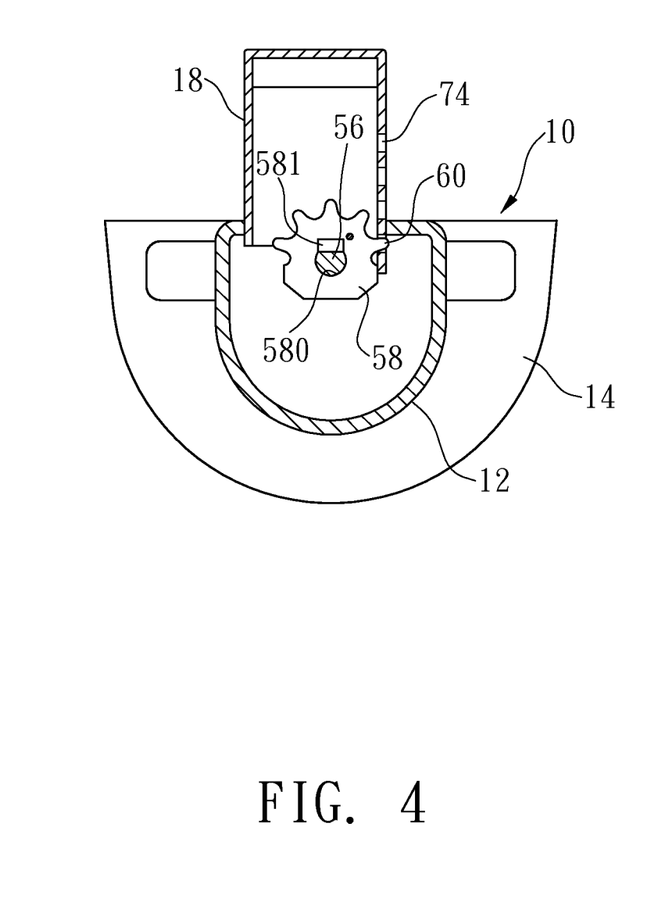
FIG. 4 is a cross-sectional view of Line A-A of FIG. 3.
Figure 5:
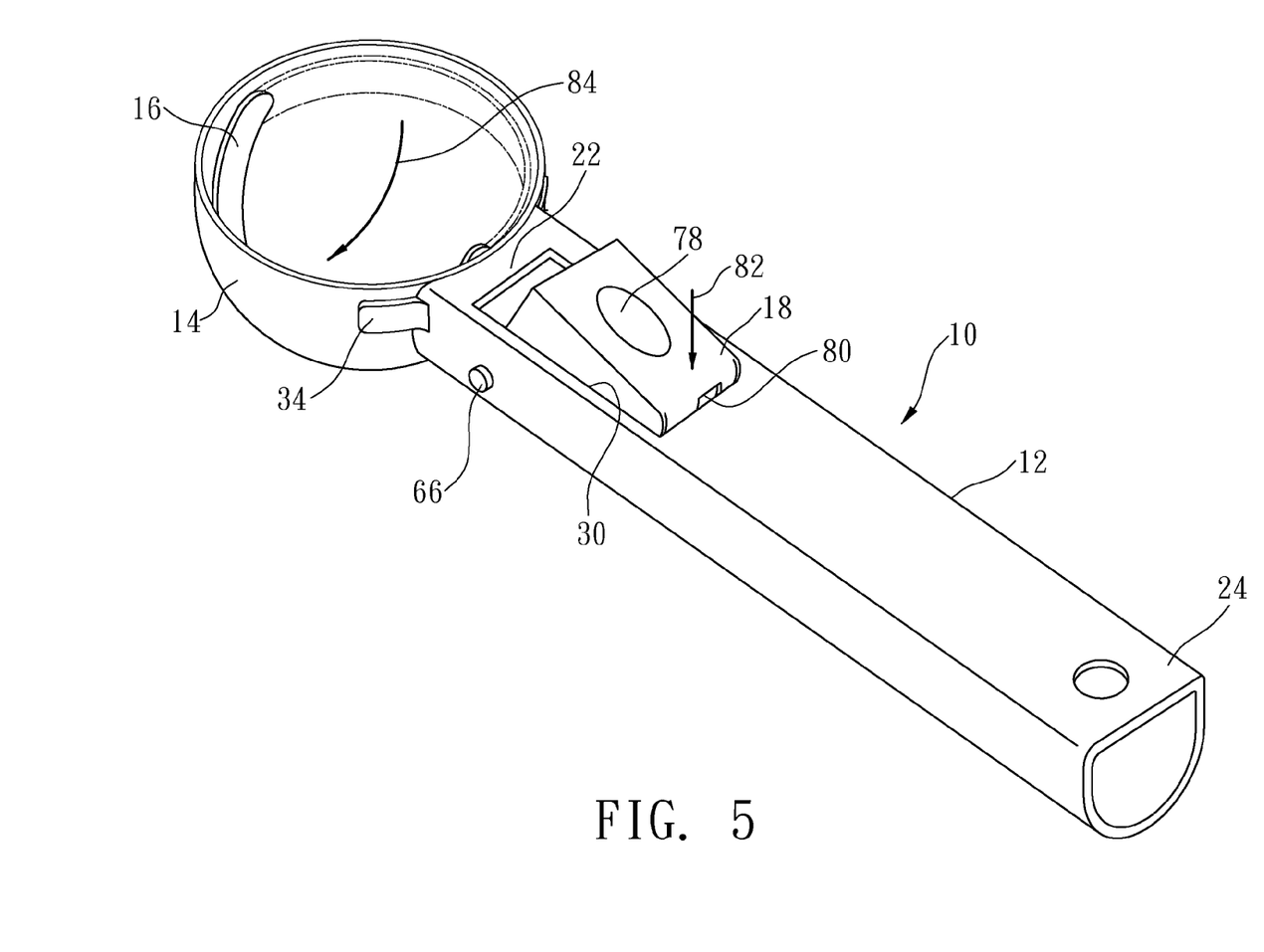
FIG. 5 is a schematic view of operating an ice cream scoop in accordance with the present invention.
Figure 6:
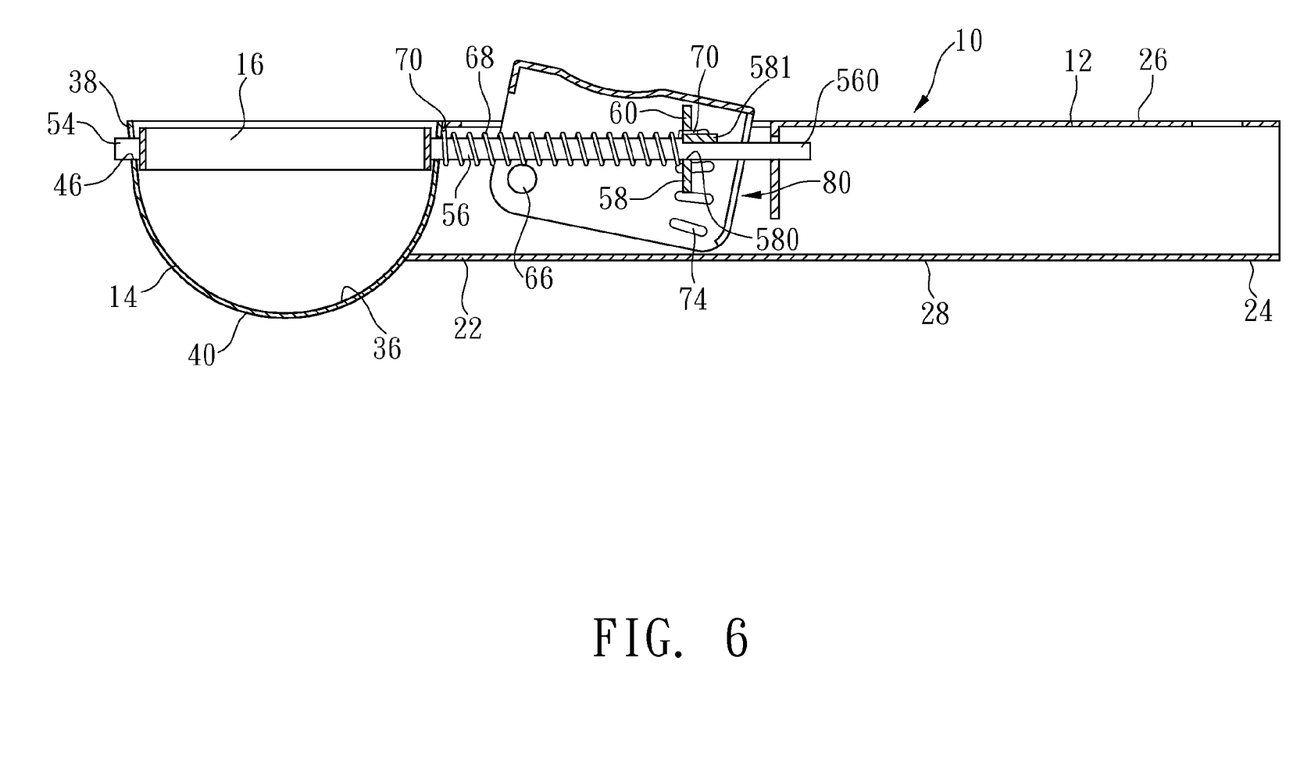
FIG. 6 is a cross-sectional view of an ice cream scoop as depicted in FIG. 5.
Figure 7:
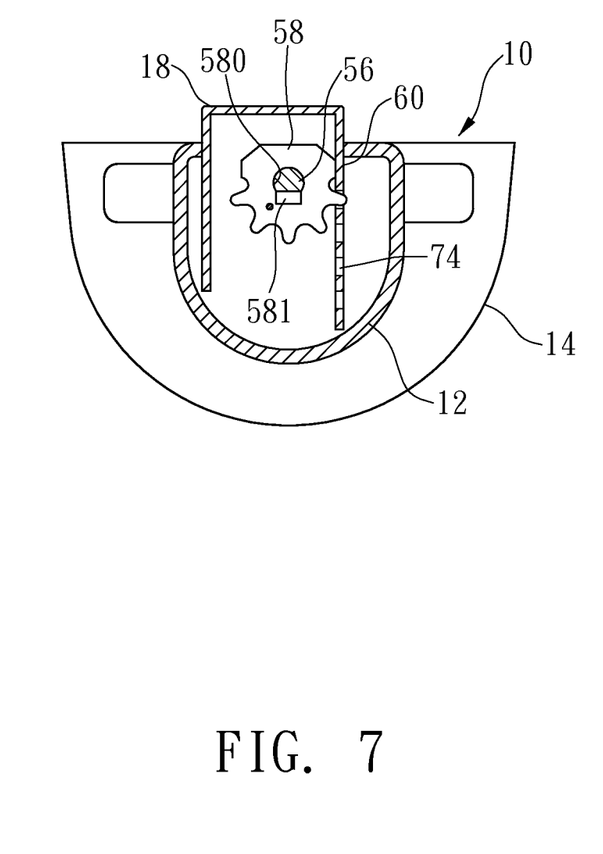
FIG. 7 is a cross-sectional view of Line 7-7 of FIG. 6.

The operating device 18 is normally moved to the popup position by the resilience of the spiral spring 68 when the operating device 18 is in the popup position, and the second distal portion 64 of the operating device 18 is tilted upward with respect to the handle 12 (as shown in FIGS. 3 and 4). The operating device 18 can be operated to move from the popup position to the press position, and the second distal position 64 of the operating device 18 moves toward the installation hole 30 (as shown in FIGS. 5 to 7). When the operating device 18 is situated at the press position, the spiral spring 68 is twisted and has restoring strength, when the operating device 18 is released, the second distal portion 64 goes back to upward position.

A plurality of grooves 74 are formed on one side wall of the operating device 18, and arranged in radial shape using the pin 66 as an axis, and the plural grooves 74 also are arranged in a curve shape with an equal distance from the pin 66, such that when the gear 58 is rotated, the plural transmission gear teeth 60 are engaged with the corresponding plural grooves 74 and push the operating device 18 to the popup position, to make the operating device 18 to sway between the popup and press positions, and the link rod 56 will be driven and rotated.

The operating device 18 further includes a top 76, a recession formed at the top 76 and provided for users to press by a finger. In addition, a through groove 80 is formed at the second end 64 of the operating device 18 and provided for passing the link rod 56, so as to prevent interference with the link rod 56 when the operating device 18 is swayed.

After the ice cream scoop 10 of the invention scoops an ice cream ball, a user can press the operating device 18 (as indicated by the arrow 82 in FIG. 5); the operating device 18 can be returned from the popup position to the press position (as shown in FIG. 6). While operating device 18 is moving, the link rod 56 is driven and rotates by the transmission gear teeth 60 of the gear 58 engage with a plural of grooves 74, such that brings scraper 16 sway along the internal wall 36 of the scooper 14 (as indicated by the arrow 84 in FIG. 5), which scraps ice cream ball in the scooper 14 away from scooper 14. Then the spiral spring 68 generates restoring strength when operating device 18 moves from popup position to press position, and twists the gear 58 to let the gear 58 drive operating device 18 from press position back to popup position (as shown in FIG. 3).

Based on the above description, the present invention has the following advantages:

1. The spiral spring 68 is sheathed on the link rod 56, and a restoring strength is generated when the gear 58 is driven by the operating device 18, therefore the spiral spring 68 only needs to be sheathed on the link rod 56 and has two end pins 70 fixed on the first end 22 of the handle 12 and one end of the gear 58 to achieve an easy installation, and the spiral spring 68 is hidden under the operating device 18 and is not easy to be seen to achieve a more pleasing effect.

2. The plural grooves 74 are arranged in a radial and curve shape having an equal distance from the pin 66, while assembling the gear 58 and plural grooves 74 together, and it is only necessary to engage the transmission gear teeth 60 with the plural grooves 74, but not necessary to emphasize on a precision combination. The plural grooves 74 are formed directly on one side wall of the operating device 18 only, but there is no need to install other components inside the operating device 18, thus making the manufacturing relatively easier and simplifying the structure, saving the components and lowering the assembly cost.

What is claimed is:

1. An ice cream scoop, comprising:

a handle, having a first end and a second end separated from each other and disposed on a longitudinal axis, and a chamber contained in the first end of the handle;

a scooper, having a hemispherical internal wall, and coupled to the first end of the handle;

a scraper, swingingly installed in the scooper, and having a first end and a second end separated from each other and disposed on the longitudinal axis, and a first end of the scraper being pivotally coupled to the scooper, and a link rod being extended from the second end of the scraper, passed through the scooper, and extended into the chamber of the first end of the handle;

a gear being installed on the link rod and rotated synchronously with the link rod, and having a plurality of transmission gear teeth arranged in a radial shape and disposed on the gear;

an operating device, having a first distal portion and a second distal portion separated from each other and disposed on the longitudinal axis, and the first distal portion of the operating device being pivotally coupled to the first end of the handle by a pin, such that the operating device can be swayed between a popup position and a press position with respect to the handle, and the operating device further including a plurality of grooves using the pin as an axis and arranged in a radial shape, and having an equal distance from the pin, and the plural transmission gear teeth being engaged corresponding to the plural grooves, and push the operating device to the popup position; and a spiral spring, accommodated in the chamber of the first end of the handle and sheathed on the link rod, and one side of the spiral spring abutting the scooper at the first end of the handle, and the other side abutting one side of the gear, and one end of the spiral spring abutting the scooper having an end tip fixed on the first end of the handle, and another end tip at the other end of the spiral spring abutting the gear being fixed onto the gear, when the gear rotates and drives the spiral spring to rotate to provide a position restoring effect; the operating device is normally moved to the popup position by the resilience of the spiral spring, when the operating device sways from the popup position to the press position, the plural grooves engage the corresponding plural transmission gear teeth from down to up in order and drive the gear, the gear rotates the link rod to drive scraper sway along the internal wall of the scooper.

2. The ice cream scoop of claim 1, wherein the handle further includes an upper portion and a lower portion separated from each other and disposed in a heightwise direction perpendicular to the longitudinal axis, and an installing hole is formed at the upper portion of the first end of the handle and interconnected to the chamber of the handle, and the operating device is installed into the chamber of the first end of the handle through the installing hole, and the scooper includes an upper end and a lower end separated from each other and arranged in the heightwise direction, and an opening defined by the hemispherical internal wall and disposed at the upper end of the scooper.

3. The ice cream scoop of claim 2, wherein the handle is a pipe, and two through holes are formed on both sides of the first end of the handle respectively, and each through hole is interconnected to the chamber of the handle, and both ends of the pin are inserted into and coupled to the two through holes of the handle respectively.

4. The ice cream scoop of claim 3, wherein the second distal portion of the operating device is tilted upward with respect to the handle if the operating device is situated at the popup position, and the second distal portion of the operating device is substantially horizontal with respect to the handle if the operating device is situated at the press position.

5. The ice cream scoop of claim 4, wherein the upper end of the scooper includes a first hole and a second hole separated from each other and disposed on the longitudinal axis, and the second hole is proximate to the first end of the handle, and a pillar is extended from the first end of the scraper and inserted into and coupled to the first hole of the scooper, and the link rod is passed through the second hole of the scooper.

6. The ice cream scoop of claim 5, wherein the driving portion of the operating device is coupled into the operating device, and the operating device further includes a top, a recession formed at the top and provided for a user to press and operate by a finger, and a through groove formed at the second distal portion of the operating device and provided for passing the link rod.

7. The ice cream scoop of claim 1, wherein the gear has a through hole formed thereon and provided for passing the link rod, a stopper installed adjacent to the through hole and bent outwardly while the through hole is formed, and the stopper abuts against a tangent formed by processing the link rod, and the stopper is fixed on the link rod by welding.

* * * * *